(12) United States Patent
Dong

(10) Patent No.: US 11,097,387 B2
(45) Date of Patent: Aug. 24, 2021

(54) MACHINING CENTER

(71) Applicants: Xiangyi Dong, Ningbo (CN); NINGBO DEMA INTELLIGENT MACHINERY CO., LTD., Ningbo (CN)

(72) Inventor: Xiangyi Dong, Ningbo (CN)

(73) Assignees: Xiangyi Dong, Ningbo (CN); NINGBO DEMA INTELLIGENT MACHINERY CO., LTD., Ningbo (CN)

(*) Notice: Subject to any disclaimer, the term of this patent is extended or adjusted under 35 U.S.C. 154(b) by 0 days.

(21) Appl. No.: 16/597,838

(22) Filed: Oct. 9, 2019

(65) Prior Publication Data
US 2020/0039011 A1 Feb. 6, 2020

Related U.S. Application Data

(63) Continuation of application No. PCT/CN2018/090741, filed on Jun. 12, 2018.

(30) Foreign Application Priority Data

| Jun. 12, 2017 | (CN) | 201710437219.1 |
| Jun. 12, 2017 | (CN) | 201720674864.0 |
| Jul. 5, 2017 | (CN) | 201720807191.1 |

(51) Int. Cl.
*B23Q 1/01* (2006.01)
*B23Q 39/02* (2006.01)
(Continued)

(52) U.S. Cl.
CPC ............ *B23Q 1/015* (2013.01); *B23C 1/002* (2013.01); *B23C 1/08* (2013.01); *B23Q 1/012* (2013.01);
(Continued)

(58) Field of Classification Search
CPC ......... B23Q 1/012; B23Q 1/01; B23Q 1/015; B23Q 1/017; Y10T 409/307728;
(Continued)

(56) References Cited

U.S. PATENT DOCUMENTS

| 765,447 A * | 7/1904 | Van Norman ......... B23Q 1/012 409/212 |
| 5,468,101 A * | 11/1995 | Shoda ................... B23Q 1/012 108/143 |

(Continued)

FOREIGN PATENT DOCUMENTS

| CN | 201157969 Y | 12/2008 |
| CN | 101480734 A * | 7/2009 |

(Continued)

OTHER PUBLICATIONS

Machine Translation of CN 104802040, which CN '040 was published Jul. 2015.*

(Continued)

*Primary Examiner* — Erica E Cadugan

(57) ABSTRACT

A machining center configured for machining workpieces includes at least one column, a beam, at least one slider, a first driving member, a second driving member, a first main shaft and a second main shaft. The column can be configured for supporting the beam. The slider can be disposed on the beam and slidable along a length direction of the beam. Both the first main shaft and the second main shaft can be arranged on the slider and located on two opposite sides of the beam. The first driving member can be configured for driving the slider to slide relative to the beam. The second driving member can be configured for driving the first main shaft and the second main shaft to operate. The first main shaft and the second main shaft can be configured for synchronously or asynchronously machining the workpieces.

15 Claims, 16 Drawing Sheets

(51) Int. Cl.
  *B23C 1/08* (2006.01)
  *B23Q 39/04* (2006.01)
  *B23Q 1/26* (2006.01)
  *B23C 1/00* (2006.01)
  *B23Q 39/00* (2006.01)

(52) U.S. Cl.
  CPC .............. *B23Q 1/017* (2013.01); *B23Q 1/26* (2013.01); *B23Q 39/022* (2013.01); *B23Q 39/04* (2013.01); *B23Q 2039/002* (2013.01); *Y10T 409/307168* (2015.01); *Y10T 409/308288* (2015.01); *Y10T 409/308344* (2015.01); *Y10T 409/309576* (2015.01)

(58) Field of Classification Search
  CPC . Y10T 409/308288; Y10T 409/307168; Y10T 409/307784; Y10T 409/308344; Y10T 409/308568; Y10T 408/36–385; Y10T 409/309576; B23C 1/002; B23C 1/08; B23C 1/10; B23C 1/04; B23C 1/045; B23B 39/006; B23B 39/16–39/24; B24B 7/005; B24B 7/224; B27C 9/04; B27C 3/04
  USPC ....... 409/202, 212, 192, 203, 213, 217, 235; 408/31–53
  See application file for complete search history.

(56) References Cited

U.S. PATENT DOCUMENTS

| | | | | |
|---|---|---|---|---|
| 6,067,695 A | * | 5/2000 | Momoitio | ............. B23Q 1/012 29/26 A |
| 6,688,352 B2 | * | 2/2004 | Marchioro | ............. B23Q 1/01 144/3.1 |
| 7,682,113 B2 | * | 3/2010 | Liou | ..................... B23Q 1/012 409/212 |

FOREIGN PATENT DOCUMENTS

| | | | | |
|---|---|---|---|---|
| CN | 101480777 | A | | 7/2009 |
| CN | 201524905 | U | | 7/2010 |
| CN | 201559028 | U | * | 8/2010 |
| CN | 104369232 | A | | 2/2015 |
| CN | 204195253 | U | * | 3/2015 |
| CN | 104802040 | A | * | 7/2015 |
| CN | 106624084 | A | * | 5/2017 |
| CN | 107020521 | A | | 8/2017 |
| CN | 108080968 | A | * | 5/2018 |
| CN | 207326429 | U | | 5/2018 |
| CN | 207387061 | U | | 5/2018 |
| CN | 210254418 | U | * | 4/2020 |
| DE | 4114828 | A1 | | 11/1992 |
| DE | 19842386 | A1 | * | 3/1999 |
| DE | 20220757 | U1 | | 4/2004 |
| DE | 102009025009 | A1 | | 12/2010 |
| EP | 2145744 | A1 | | 1/2010 |
| ES | 2118016 | A1 | * | 9/1998 |
| FR | 2694720 | A1 | | 2/1994 |
| JP | 61-075934 | U | * | 5/1986 |
| JP | 10-180522 | A | * | 7/1998 |
| JP | 2000167738 | A | | 6/2000 |
| JP | 2007296602 | A | | 11/2007 |
| TW | 201008696 | A | * | 3/2010 |

OTHER PUBLICATIONS

International Search Report of PCT/CN2018/090741.
European Search Report, EP 18 81 6837, dated Mar. 24, 2020.
Japan Office Action, 2019-553561, dated Oct. 23, 2020.

* cited by examiner

MACHINING CENTER

CROSS-REFERENCE TO RELATED APPLICATIONS

This application is a continuation of PCT patent application PCT/CN2018/090741 filed on Jun. 12, 2018, which claims all benefits accruing under 35 U.S.C. § 119 from China Patent Application Nos. 201710437219.1, filed on Jun. 12, 2017, 201720674864.0, filed on Jun. 12, 2017, and 201720807191.1, filed on Jul. 5, 2017, in the China National Intellectual Property Administration, the content of which is hereby incorporated by reference.

TECHNICAL FIELD

The present disclosure relates to a machining center.

BACKGROUND

The rapid development of industrialization has increased demands of the manufacture of mechanical parts. A machining center is a core equipment for the manufacture of the mechanical parts and determines the forming speed and forming quality of the mechanical parts. Taking wheel hubs widely used in the automotive industry as an example, the machining center for automobile hubs often uses a four-beam assembly system. FIG. 1 shows a structure of the machining center in the prior art. Due to the size of the four-beam assembly, in a case that the space is certain, the machining stroke of the workpieces may be reduced. Furthermore, the machining center in FIG. 1 is not only bulky, but also heavy. Only a single machining main shaft can be mounted on the two beams and the processing capability is relatively weak.

SUMMARY

The present disclosure provides an improved machining center that has a smaller volume and weight, and relatively high processing capability.

The machining center, which can be configured for machining workpieces, can include at least one column, a beam, at least one slider, a first driving member, a second driving member, a first main shaft and a second main shaft. The at least one column can be configured for supporting the beam. The at least one slider can be disposed on the beam and slide along a length direction of the beam. Both the first main shaft and the second main shaft can be arranged on the at least one slider and located on two opposite sides of the beam along a width direction of the beam, respectively. The first driving member can be configured for driving the slider to slide relative to the beam. The second driving member can be configured for driving the first main shaft and the second main shaft to operate. The first main shaft and the second main shaft can be configured for synchronously or asynchronously machining the workpieces.

The machining center can include one slider. The first main shaft and the second main shaft can be simultaneously arranged on the slider and symmetrically arranged relative to the slider.

The beam can include a first layer and a second layer above and spaced with the first layer. A first sliding groove can be formed in the first layer. A second sliding groove can be formed in the second layer. The slider can slide along the length direction of the beam through the first sliding groove and the second sliding groove.

The machining center can include a connecting structure disposed between the first main shaft and the second main shaft and fixedly connected with the first main shaft and the second main shaft.

The machining center can include two sliders, i.e. a first slider and a second slider. The first main shaft can be fixed on the first slider. The second main shaft can be fixed on the second slider. The first slider and the second slider can be respectively arranged on two opposite sides of the beam along the width direction of the beam.

Edges of the beam can extend outwards and form four convex portions, wherein two of the four convex portions can be located on one side of the beam and embedded in the first slider, and the other two of the four convex portions can be located on the other side of the beam and embedded in the second slider.

One end of the at least one column can be connected with the beam. A width of the one end of the at least one column close to the beam can be smaller than that of the other end of the at least one column away from the beam.

The machining center can include two columns. The two columns can be oppositely arranged at two ends of the beam and configured for supporting the beam.

The at least one column can include a hollow structure.

The machining center can further include a base connected with the at least one column.

The machining center can further include at least one supporting board configured for bearing the workpieces. A sliding rail can be disposed on the base so that the at least one supporting board can slide relative to the base along the sliding rail.

The machining center can further include at least one third driving member arranged on the at least one supporting board. A nut and screw rod mechanism can be disposed between the at least one third driving member and the at least one supporting board. The at least one third driving member can drive the at least one supporting board to slide along the sliding rail through the nut and screw rod mechanism.

The machining center can include one supporting board and one third driving member.

The machining center can include two supporting boards and two third driving members, and the two third driving members can drive the two supporting boards to slide relative to the base, respectively.

Corners and edges of the at least one column. The beam and the at least one slider can be in arc-shaped.

The machining center of the present disclosure includes a single beam structure, such that the size and the weight can be reduced, a plurality of main shafts can be hung on the single beam, and the machining production capacity can be improved.

DETAILED DESCRIPTION

The embodiments of the present disclosure will be clearly and completely described. Apparently, the described embodiments are merely a part of the embodiments of the present disclosure rather than all embodiments. All other embodiments obtained by persons in the art based on the embodiments of the present disclosure without creative efforts shall be within the protection scope of the present disclosure.

Figure 1:
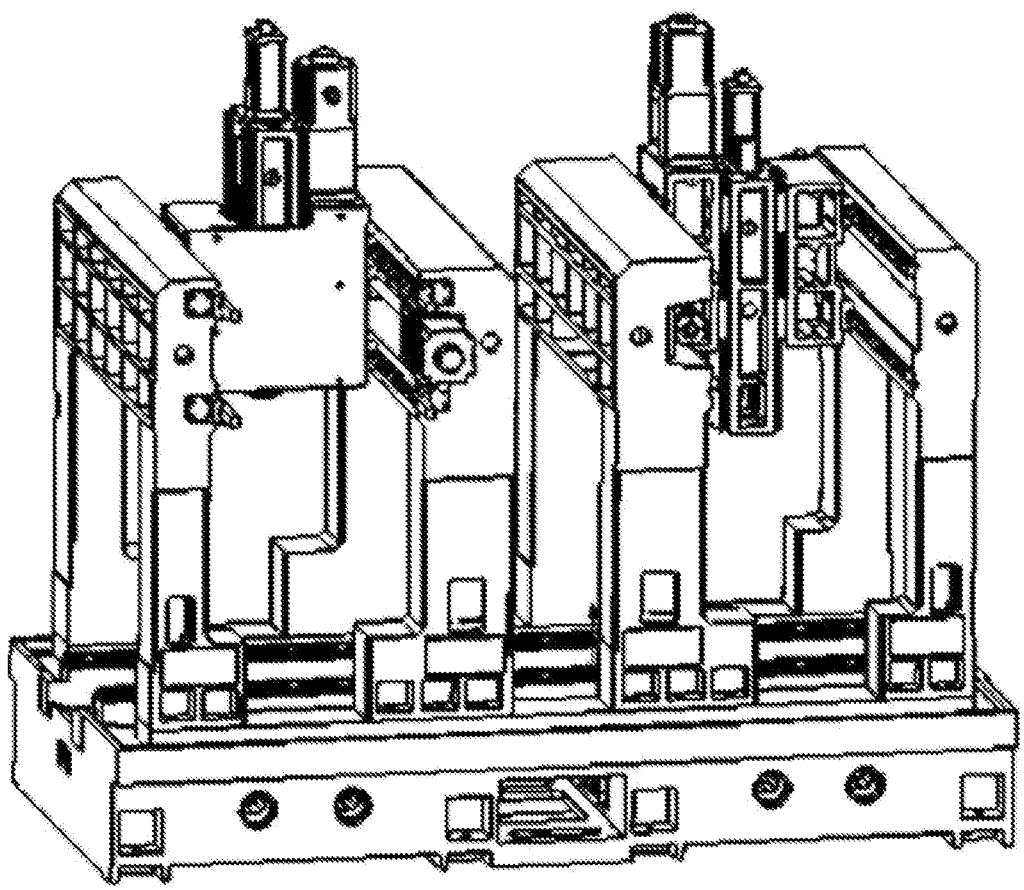
FIG. 1 is a perspective view of a machining center in the prior art.
Figure 2:
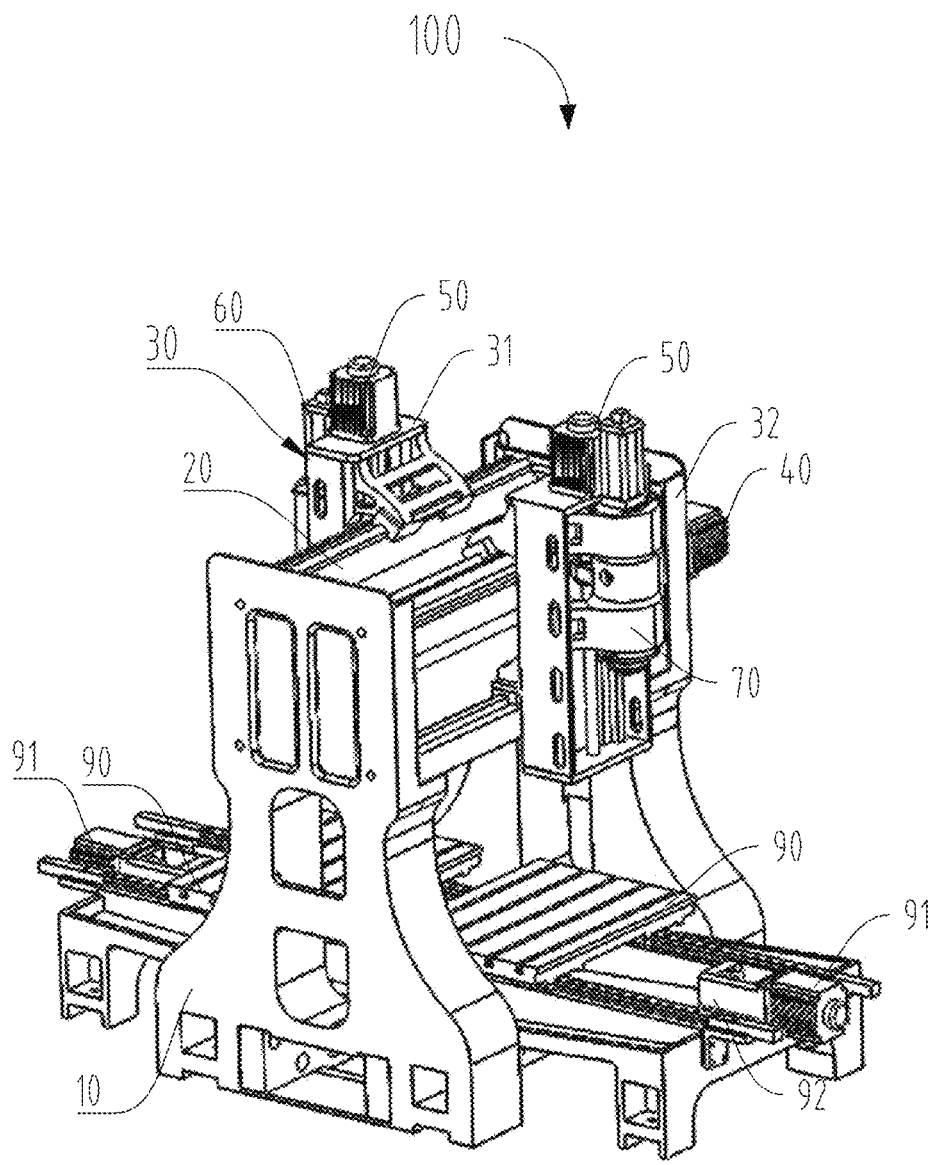
FIG. 2 is a perspective view of a machining center in a first embodiment of the present disclosure.

Referring to FIG. 2, a machining center 100 in a first embodiment of the present disclosure is provided. The machining center 100 can include a column 10, a beam 20, a slider 30, a first driving member 40, a second driving member 50, a first main shaft 60 and a second main shaft 70. The column 10 can be configured for supporting the beam 20. The slider 30 can be arranged on the beam 10 and able to slide relative to the beam 20. Both the first main shaft 60 and the second main shaft 70 can be arranged on the slider 30 and located on two opposite sides of the beam 20 along a width direction of the beam 20, respectively. The first driving member 40 can be configured for driving the slider 30 to slide relative to the beam 20. The second driving member 50 can be configured for driving the first main shaft 60 and the second main shaft 70 to operate. The first main shaft 60 and the second main shaft 70 can be matched with each other and configured for synchronously or asynchronously machining workpieces.

A workpiece being machined can be an automobile hub. The machining center 100 can be configured for machining the automobile hub. The machining center 100 is not limited to machine automobile hubs, and the workpiece being machined can also be other parts except the automobile hub in other embodiments. That is, the machining center 100 can also be used for machining and manufacturing other parts except the automobile hub.

The structure of components of the machining center 100 will be explained as below.

Figure 3:
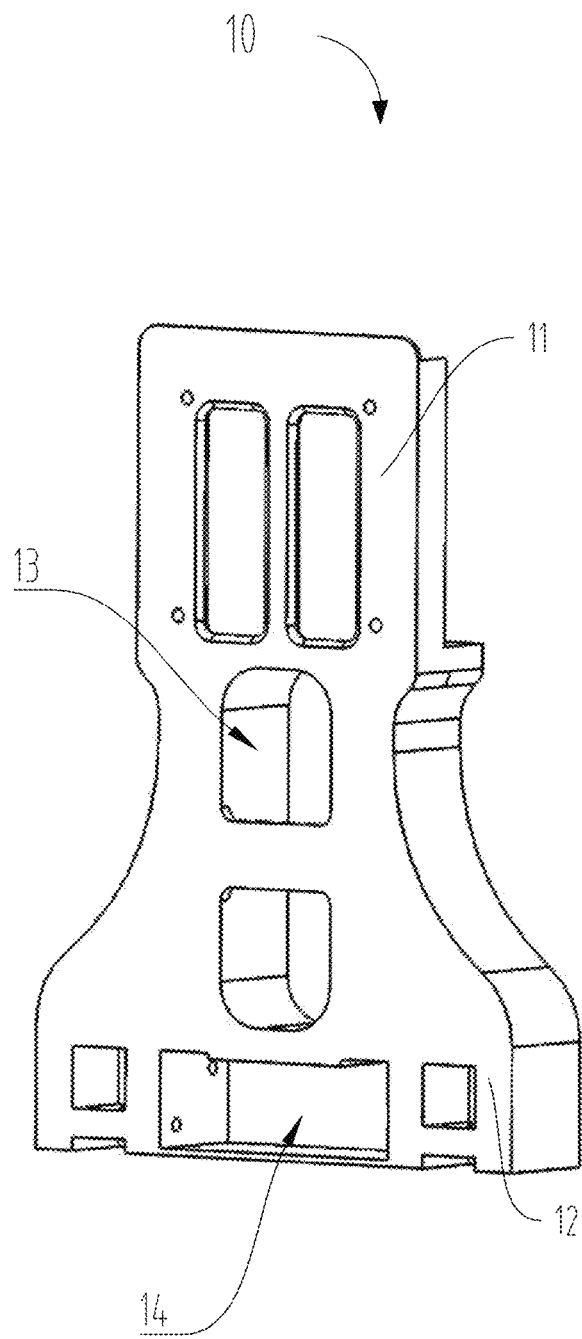
FIG. 3 is a perspective view of a column of the machining center in the first embodiment of the present disclosure.

Referring to FIG. 3, a structure of the column 10 in the first embodiment is shown. In a side view, the column 10 can be in a herringbone shape. The column 10 can include a first end 11 close to the beam 20 and a second end 12 opposite to the first end 11. The second end 12 of the column 10 can be in contact with the ground. A width of the first end 11 of the column 10 can be smaller than that of the second end 12 of the column 10. The column 10 with the herringbone shape can have a stress distribution which is close to the structural stress, such that it can meet the requirements and its safety is higher.

The column 10 can include a hollow structure 13. The hollow structure 13 can be configured for reducing the weight of the column 10. The overall weight of the machining center 100 can be reduced on the basis that the structural strength of the column 10 is maintained. The transportation cost is reduced and it is convenient to transport.

The machining center can include two columns 10. The two columns 10 can be oppositely arranged and respectively connected to two ends of the beam 20. It is understood that in another embodiment, the number of the columns 10 can be one, so that the cost of the machining center 100 can be reduced. In another embodiment, the number of the columns 10 can be more than two, such that the stability of the machining center 100 can be further improved.

Figure 4:
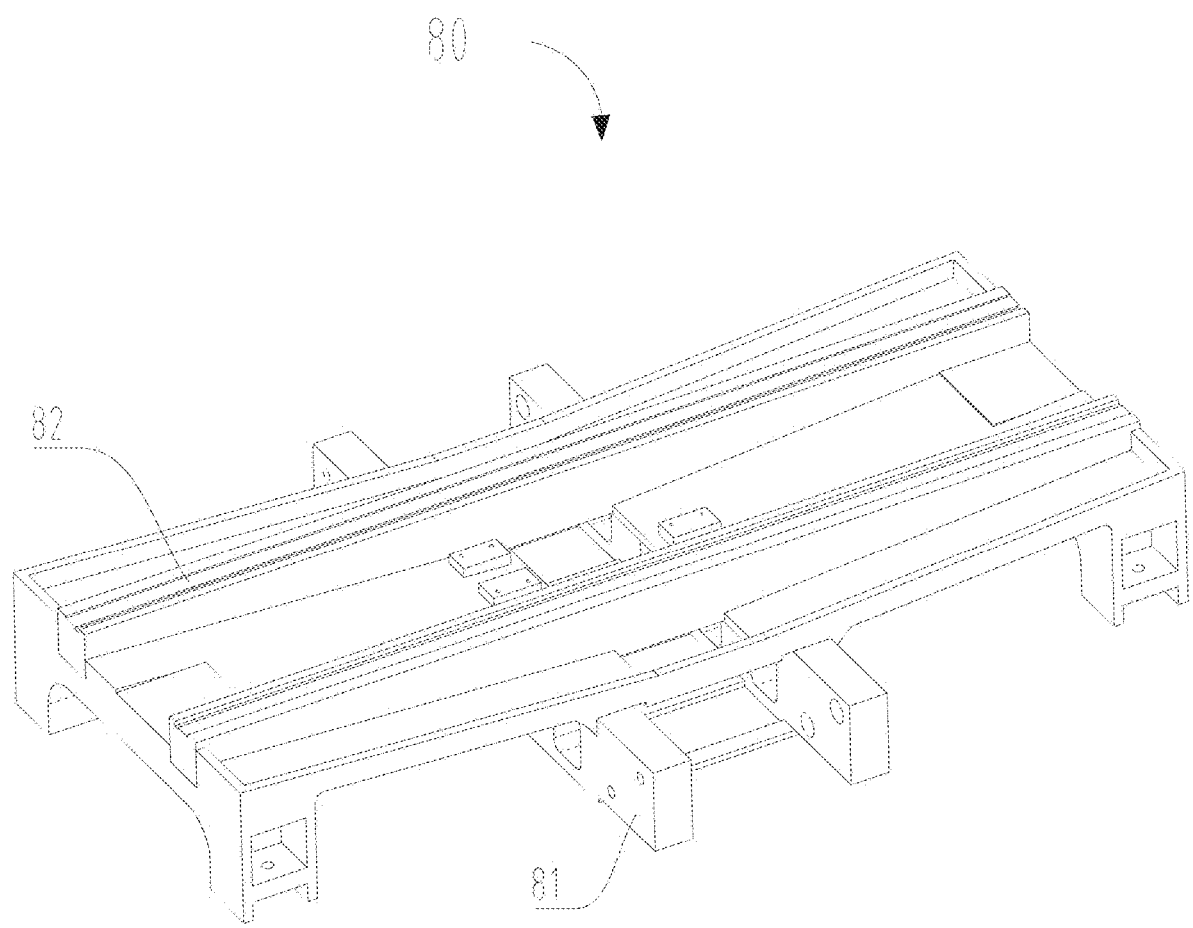
FIG. 4 is a perspective view of a base of the machining center in the first embodiment of the present disclosure.

The machining center 100 can further include a base 80. Referring to FIG. 4, a structure of the base 80 is shown. The base 80 can be in contact with the ground and fixedly connected to the two columns 10. The base 80 can have a rectangular shape. A plurality of bumps 81 can be arranged on two sides of the base 80 in a length direction of the base 80 and in the middle of the length direction of the base 80. Furthermore, two bumps 81 can be respectively provided on each side of the base 80, parallel and spaced with each other. The base 80 can be configured for reducing the gravity center of the machining center 100 and increasing a contact area with the ground, such that a vibration resistance and the stability of the machining center 100 can be improved.

Referring to FIG. 3, a plurality of through holes 14 can be formed in the second end 12 of the column 10. The plurality of through holes 14 can be configured for accommodating part of the bumps 81, and the bumps 81 can penetrate through the plurality of through holes 14 so as to realize the matching and fixing of the column 10 and the base 80. The column 10 and the base 80 can be mutually fixed, so that the integrality of the machining center 100 can be improved and its overall performance can be improved.

In other embodiments, if the stability and firmness of the machining center 100 are not important, the base 80 can also be omitted.

The machining center 100 can further include a supporting board 90 configured for supporting the workpiece. The supporting board 90 can be further arranged on one side of the base 80 away from the ground. A plurality of parallel sliding rails 82 can be arranged on the one side of the base 80 close to the supporting board 90. The sliding rails 82 can extend along the length direction of the base 80. The supporting board 90 can be arranged on the plurality of parallel sliding rails 82 so as to ensure sliding accuracy of the supporting board 90.

Figure 5:
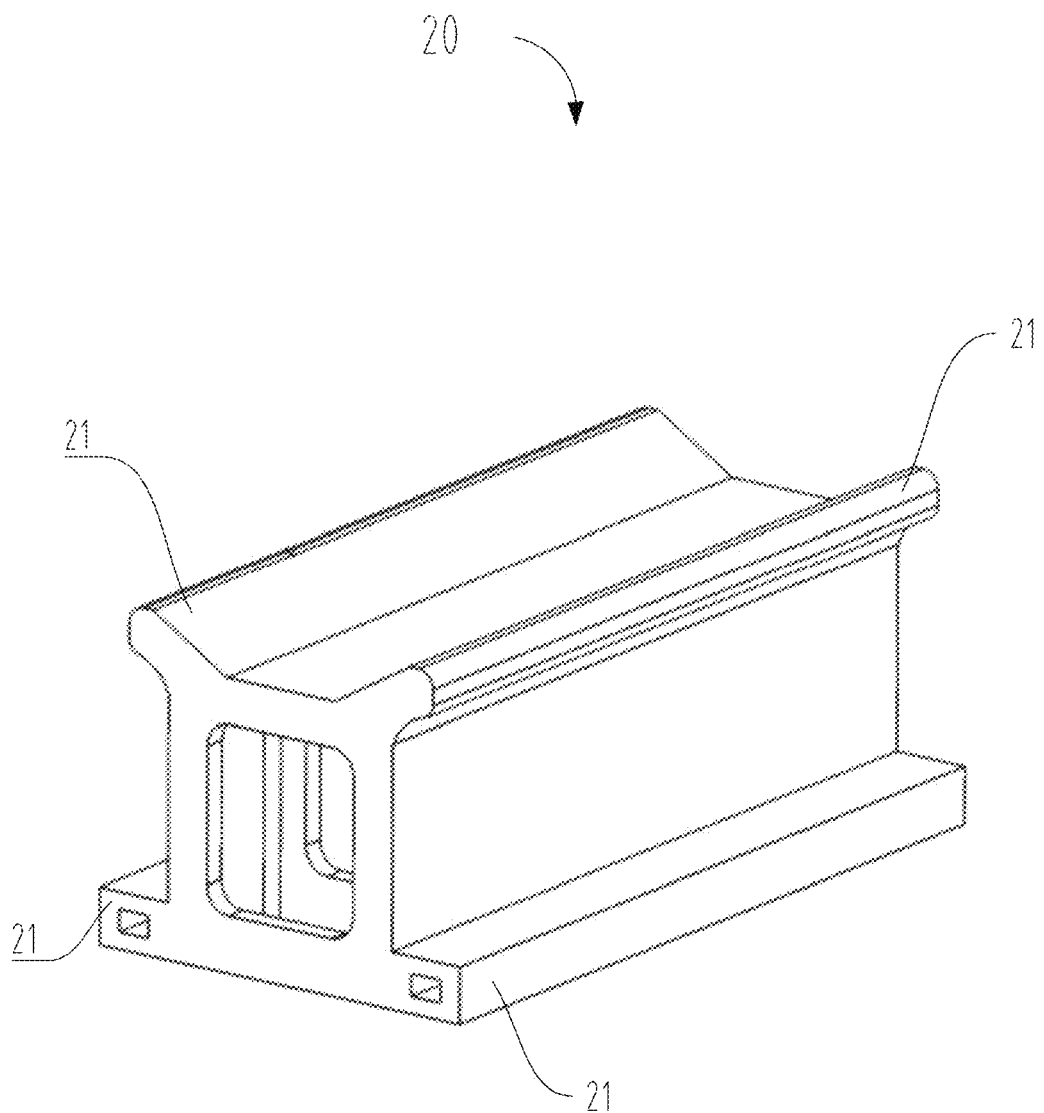
FIG. 5 is a perspective view of a beam of the machining center in the first embodiment of the present disclosure.

Referring to FIG. 5, a structure of a beam 20 in the first embodiment is shown. The beam 20 can be disposed between the two columns 10. Two ends of the beam 20 can be fixedly connected to the first end 11 of the column 10. The beam 20 can be perpendicular to the length direction of the base 80 and the beam 20 can be in a strip shape. The slider 30 can be capable of sliding relative to the beam 20. In detail, the slider 30 can be arranged in a direction perpendicular to the length direction of the beam 20. The slider 30 can move back and forth along the length direction of the beam 20.

Corners and edges of the column, the beam and the at least one slider can be in arc-shaped, which can effectively transmit the load, avoid the stress concentration, prevent the damage of the structure, and improve appearance of the structure.

The first driving member 40 can be connected with the slider 30 and configured for driving the slider 30 to slide relative to the beam 20. The first main shaft 60 and the second main shaft 70 for machining the workpieces can be arranged on the slider 30. The first driving member 40 can drive the slider 30 to slide on the beam 20, so that machining positions of the first main shaft 60 and the second main shaft 70 can be adjusted to meet machining requirements.

The first main shaft 60 and the second main shaft 70 can be respectively connected to the second driving member 50. The second driving member 50 can be configured for driving the first main shaft 60 and the second main shaft 70 to operate. In one embodiment, the number of the second driving members 50 can be two, one second driving member 50 can be configured for driving the first main shaft 60 to operate, and the other second driving member 50 can be configured for driving the second main shaft 70 to operate.

In this embodiment, the first driving member 40 and the second driving member 50 are both motors. In other embodiments, the first driving member 40 and the second driving member 50 can also be other types of power devices other than a motor.

In this embodiment, a cutting tool (not shown) can be disposed on the first main shaft 60 and the second main shaft 70. Both the first main shaft 60 and the second main shaft 70 can both be used for cutting the workpieces. It is understood that in other embodiments the first main shaft 60 and the second main shaft 70 can also be equipped with other types of machining tools configured for grinding, milling or other types of machining processes of the workpieces.

Figure 6:
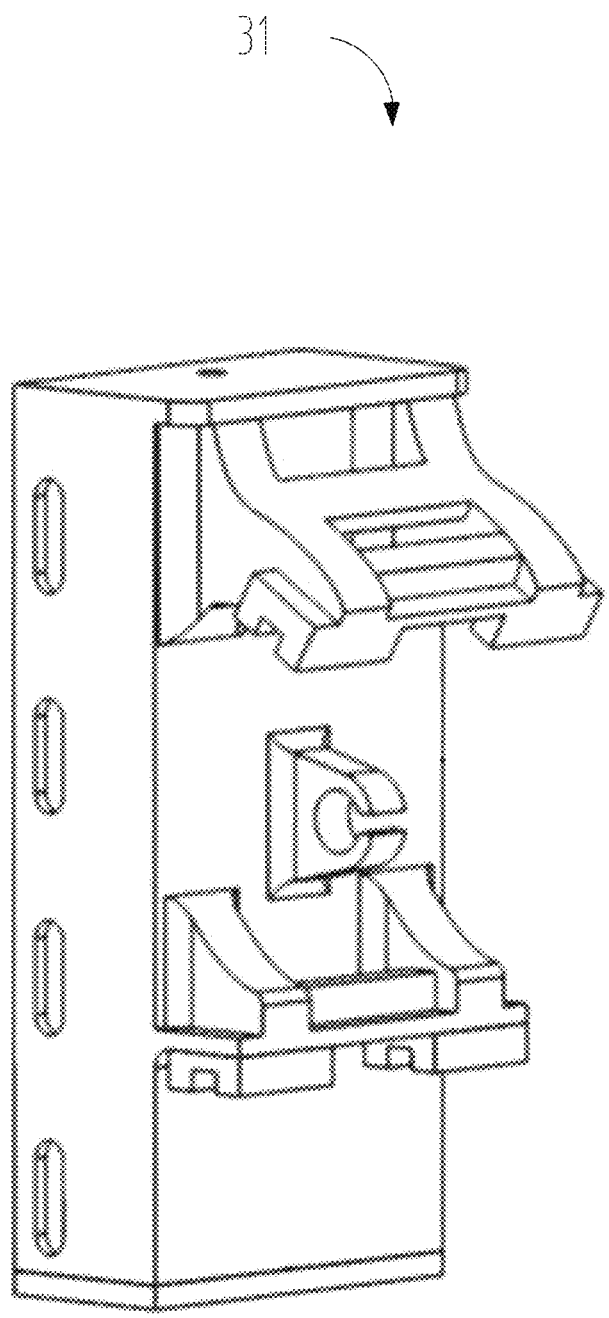
FIG. 6 is a perspective view of a first slider of the machining center in the first embodiment of the present disclosure.
Figure 7:
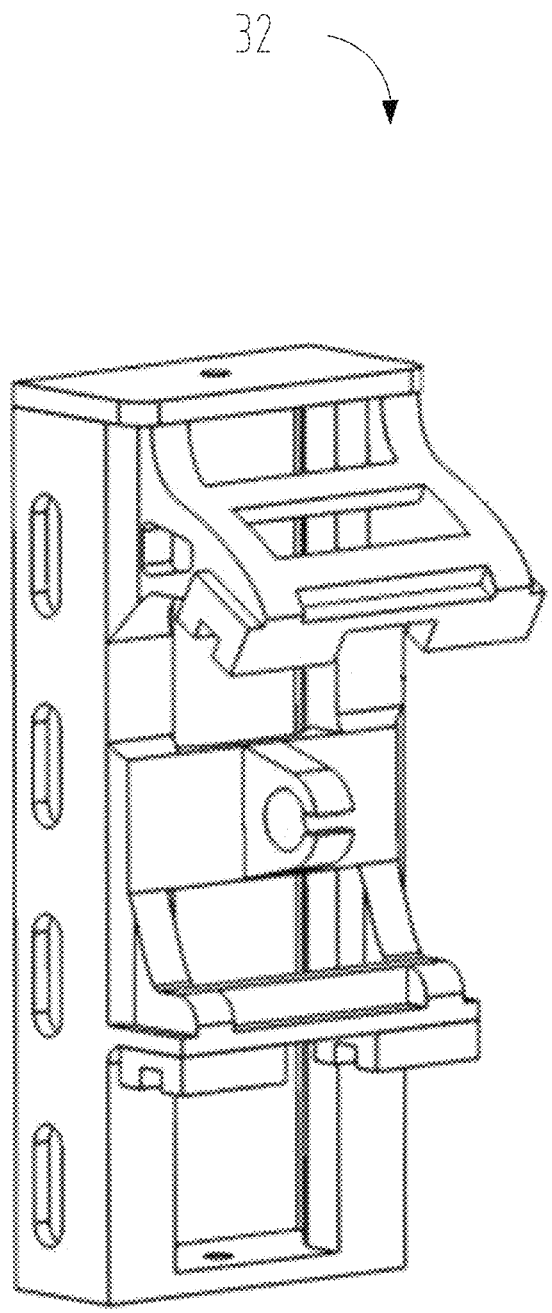
FIG. 7 is a perspective view of a second slider of the machining center in the first embodiment of the present disclosure.

In the first embodiment of the present disclosure, the machining center 100 can include two sliders 30, i.e., a first slider 31 and a second slider 32. Referring to FIGS. 6 and 7, FIG. 6 shows the perspective view of the first slider 31 of the machining center in the first embodiment of the present disclosure, and FIG. 7 shows the perspective view of the second slider 32 of the machining center in the first embodiment of the present disclosure. The first slider 31 and the second slider 32 can be arranged on two sides of the beam 20 along the length direction, respectively. As shown in FIG. 2, the positions of the first slider 31 and the second slider 32 can be symmetric about the beam 20, so that the stress of the beam 20 can be balanced, the machining precision can be improved, and the service life can be prolonged.

The number of the supporting boards 90 on the base 80 can also be two. One supporting board 90 can be configured for supporting the workpiece for the first slider 31, and the other supporting board 90 can be configured for supporting the workpiece for the second slider 32. The two supporting boards 90 can be symmetrically arranged along the beam 20, such that a distance between the supporting board 90 and the first main shaft 60 can be the same as a distance between the supporting board 90 and the second main shaft 70, and the consistency and uniformity of the workpieces can be improved.

The supporting board 90 can be connected to the third driving member 91. The third driving member 91 can be configured for driving the supporting board 90 to move, such that the workpieces on the supporting board 90 can move to a proper machining position. In this embodiment, the number of the third driving members 91 can be also two, and each third driving member 91 can drive one supporting board 90 to move.

In this embodiment, the third driving member 91 can drive the supporting board 90 via a nut and screw rod mechanism 92. The nut and screw rod mechanism 92 can be configured for converting a rotation of the third driving member 91 into a rectilinear motion of the supporting board 90. It can be understood that in other embodiments, the third driving member 91 can further drive the supporting board 90 via other structures except the nut and screw rod mechanism 92.

Figure 8:
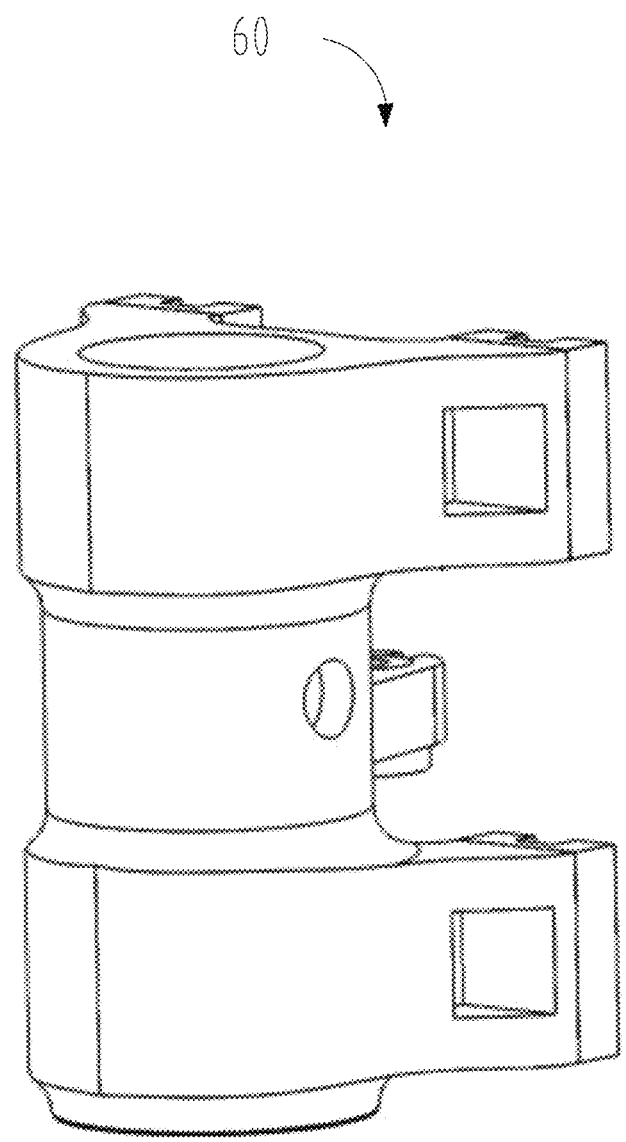
FIG. 8 is a perspective view of a first main shaft of the machining center in the first embodiment of the present disclosure.
Figure 9:
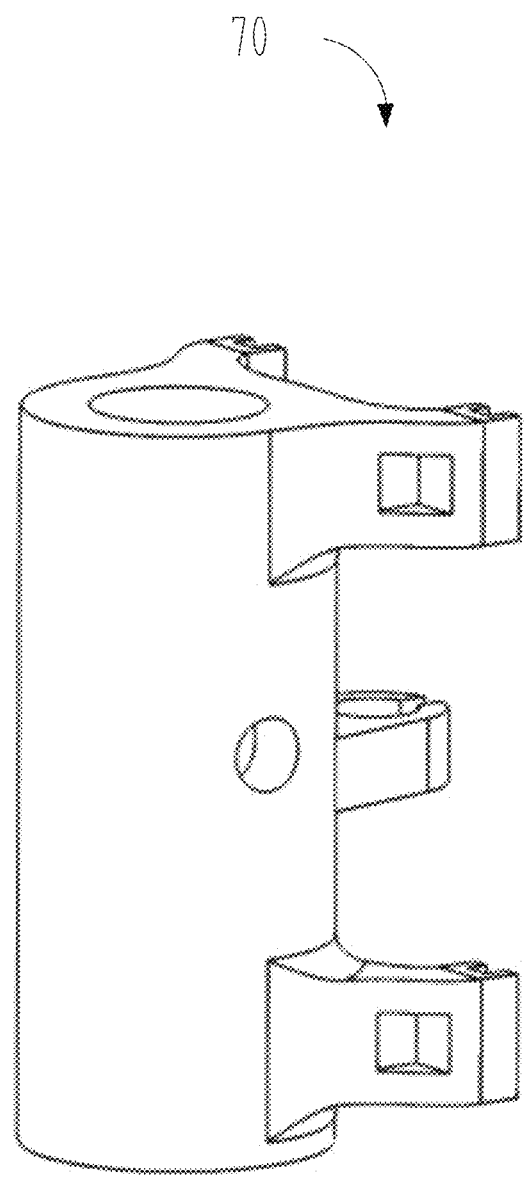
FIG. 9 is a perspective view of a second main shaft of the machining center in the first embodiment of the present disclosure.

Referring to FIGS. 8 and 9, FIG. 8 shows the perspective view of the first main shaft 60 of the machining center in the first embodiment of the present disclosure, and FIG. 9 shows the perspective view of the second main shaft 70 of the machining center in the first embodiment of the present disclosure. The first main shaft 60 can be configured for finish machining. The first slider 31 can be configured for driving the first main shaft 60 to move, the first main shaft 60 can move back and forth in an arrangement direction of the first slider 31. The second main shaft 70 can be configured for rough machining. The second slider 32 can be configured for driving the second main shaft 70 to move. The second main shaft 70 can move back and forth in an arrangement direction of the second slider 32. Therefore, the first main shaft 60 and the second main shaft 70 can move back and forth along the length direction of the beam 20 and along the arrangement direction of the first slider 31 or the second slider 32. The first main shaft 60 and the second main shaft 70 can be rotatable itself, so that multi-shaft machining can be realized and the machining can be more comprehensive.

The first main shaft 60 and the second main shaft 70 can be symmetric about the beam 20. Such that the stress of the beam 20 can be balanced, the machining precision can be improved, and the product quality can be higher.

Referring to FIG. 5, edges of the beam 20 extend outward and form four convex portions 21. Two of the four convex portions 21 can be located on one side of the beam 20 and embedded in the first slider 31, and the other two of the four convex portions 21 can be located on the other side of the beam 20 and embedded in the second slider 32. The shape of the convex portions 21 can be designed according to requirements, so as to increase connecting strength of the first slider 31 and the second slider 32.

In this embodiment, the first main shaft 60 and the second main shaft 70 can be connected to a same control system. The two supporting boards 90, the first slider 31 and the second slider 32 can be correspondingly connected to the control system. The first main shaft 60 and the second main shaft 70 can synchronously move, such that they can machine two workpieces at the same time, the stress of the beam 20 can be balanced all the time, the machining precision can be improved, and the consistency of machining of two workpieces can be guaranteed.

In other embodiments the first main shaft 60 and the second main shaft 70 can also be connected to different control systems. For example, the first main shaft 60, one supporting board 90, and the first slider 31 can be connected with one control system; the second main shaft 70, the other supporting board 90, and the second slider 32 can be connected with the other control system. The first main shaft 60 and the second main shaft 70 are connected to different control systems, such that the working parameters of machining speeds, precision and shapes can be different and independently selected and the adaptability of the machining center 100 can be higher.

In the machining center including four-beam assembly of the prior art, its first six natural frequencies are 46.62 HZ, 6.17 HZ, 65.24 HZ, 90.19 HZ, 108.83 HZ and 170.05 HZ, respectively, while in the machining center 100 of the present disclosure, since the two columns 10 are independently arranged on the two sides of the base 80 and directly contacted with the ground, its first six natural frequencies are 82.27 HZ, 108.03 HZ, 154.3 HZ, 160.65 HZ, 210.51 HZ and 296.51 HZ, respectively. Comparing with the machining center including four-beam assembly, the first six natural frequencies of the machining center 100 in the present disclosure are increased. That is, the probability of resonance between the other members such as the beam, the column, the base, sliders, etc. and the driving members such as a motor and the like can be reduced, so that the precision of workpiece machining can be improved.

Figure 10:
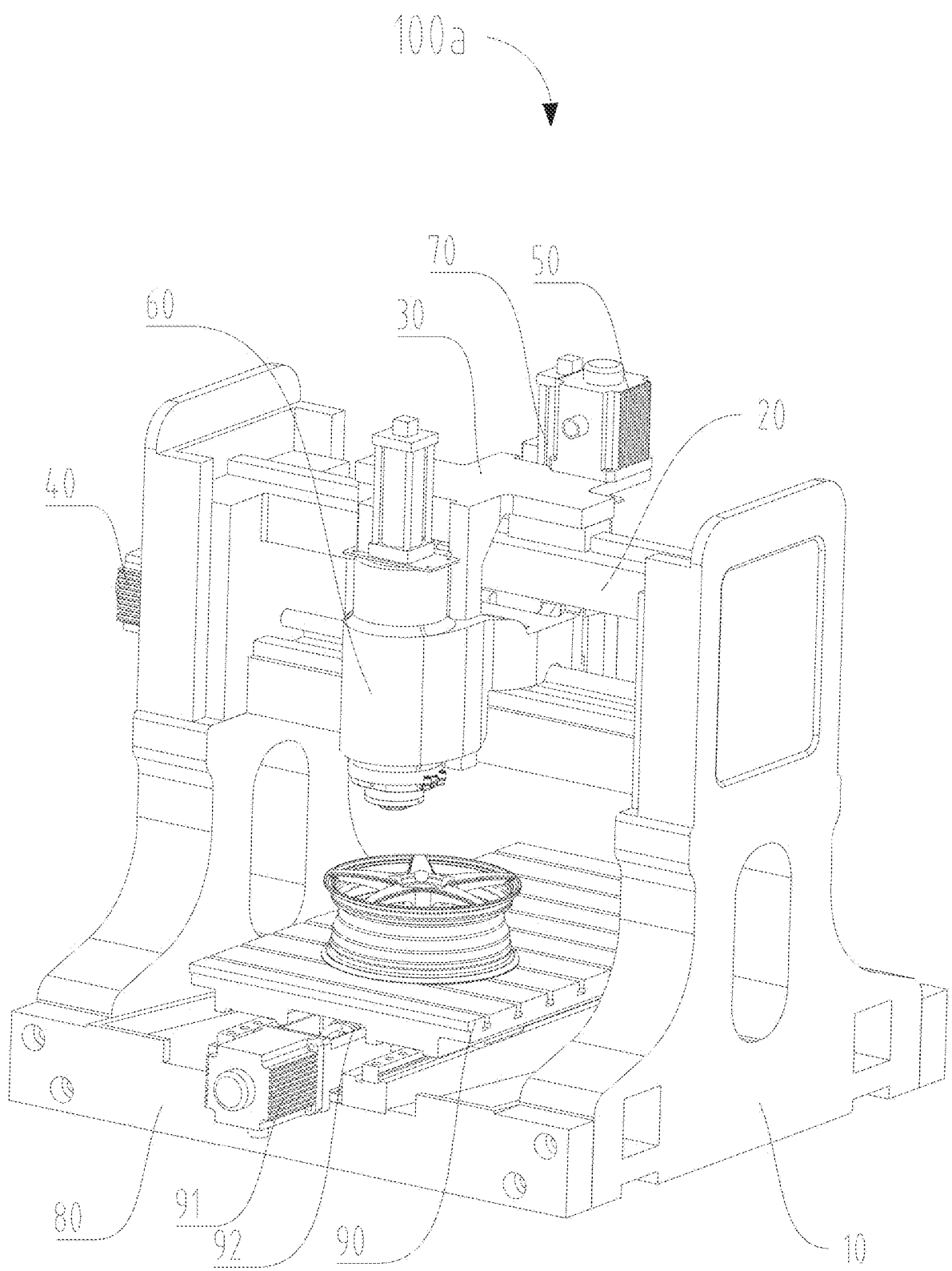
FIG. 10 is a perspective view of a machining center in the second embodiment of the present disclosure.
Figure 11:
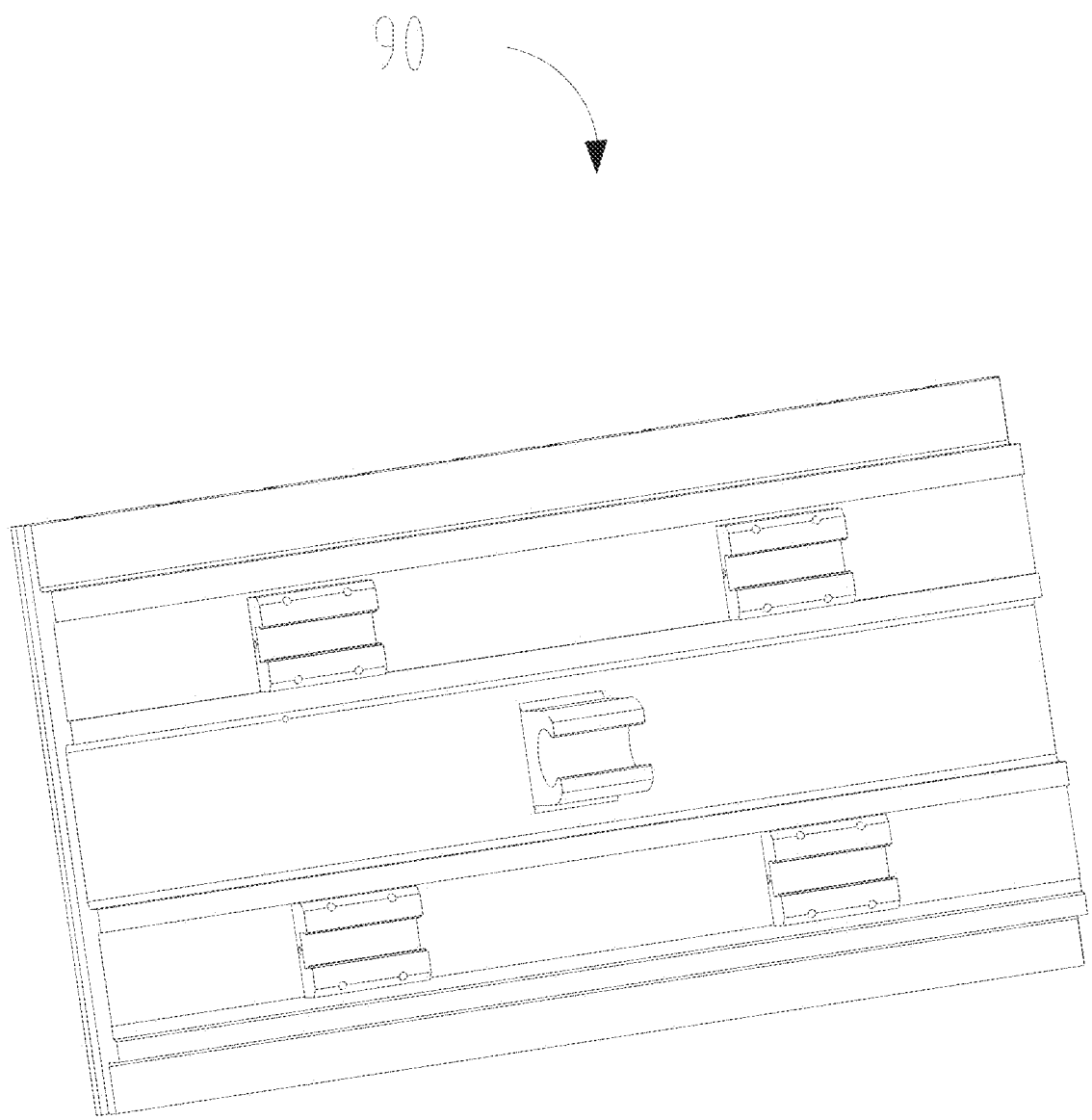
FIG. 11 is a perspective view of a supporting board of the machining center in the second embodiment of the present disclosure.

Referring to FIGS. 10 and 11, FIG. 10 shows the perspective view of the machining center 100a in the second embodiment of the present disclosure, and FIG. 11 shows the perspective view of the supporting board 90 of the machining center 100a in the second embodiment of the present disclosure. In the second embodiment of the present disclosure, the number of the supporting boards 90 can be one, and the number of the third driving member 91 configured for driving the supporting board 90 to move can also be one. The third driving member 91 can drive the supporting board 90 to move to adjust the position of the workpiece arranged on the supporting board 90, such that the first main shaft 60 and the second main shaft 70 can conveniently carry out the machining process.

The supporting board 90 can be deflected to one side of one of the columns 10. The two columns 10 can be independently arranged on the base 80. The column 10 can be detachably fixed on the base 80 so as to improve integrity and installation convenience of the machining center 100a.

Figure 12:
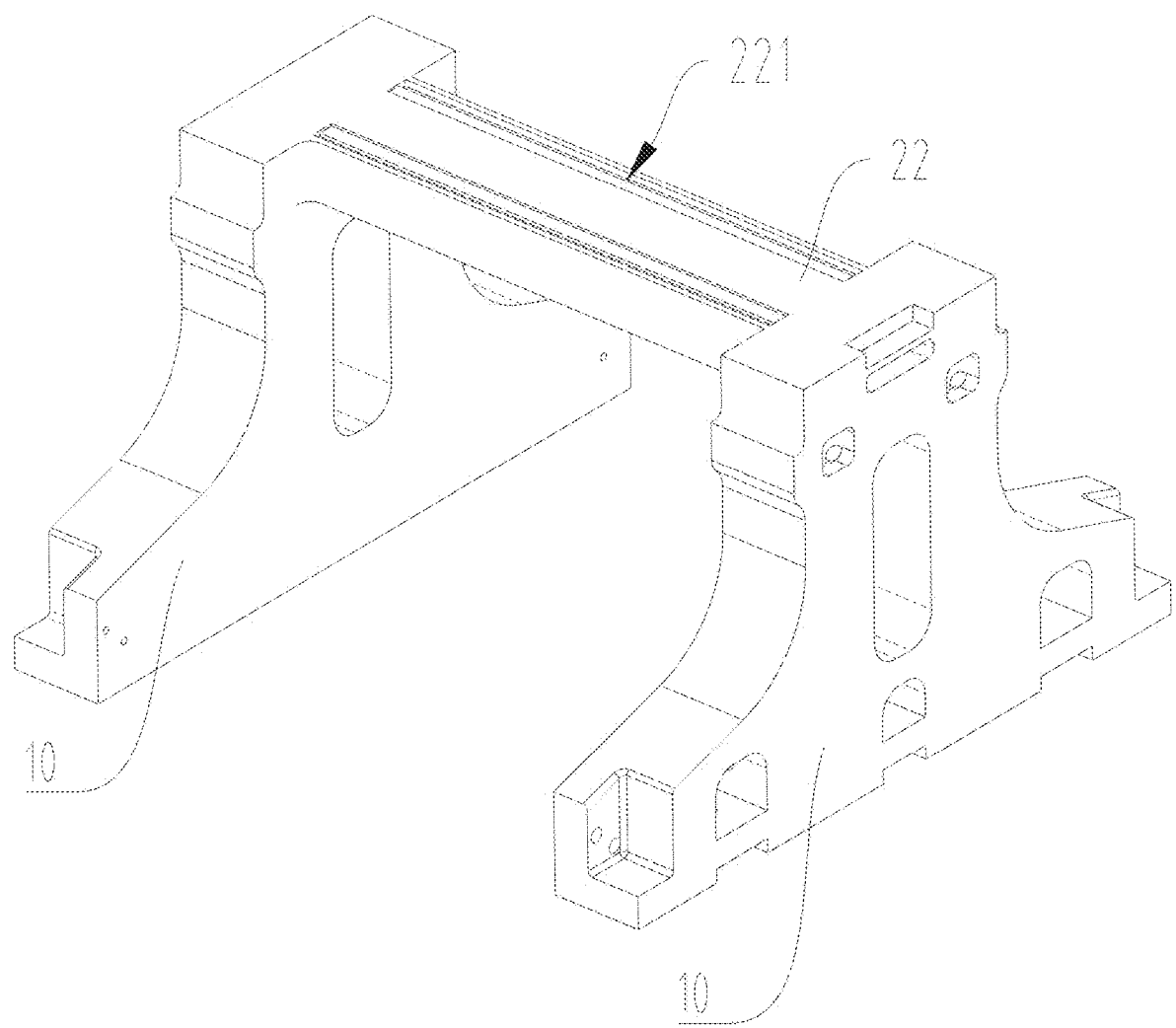
FIG. 12 is a perspective view of a column of the machining center in the second embodiment of the present disclosure.
Figure 13:
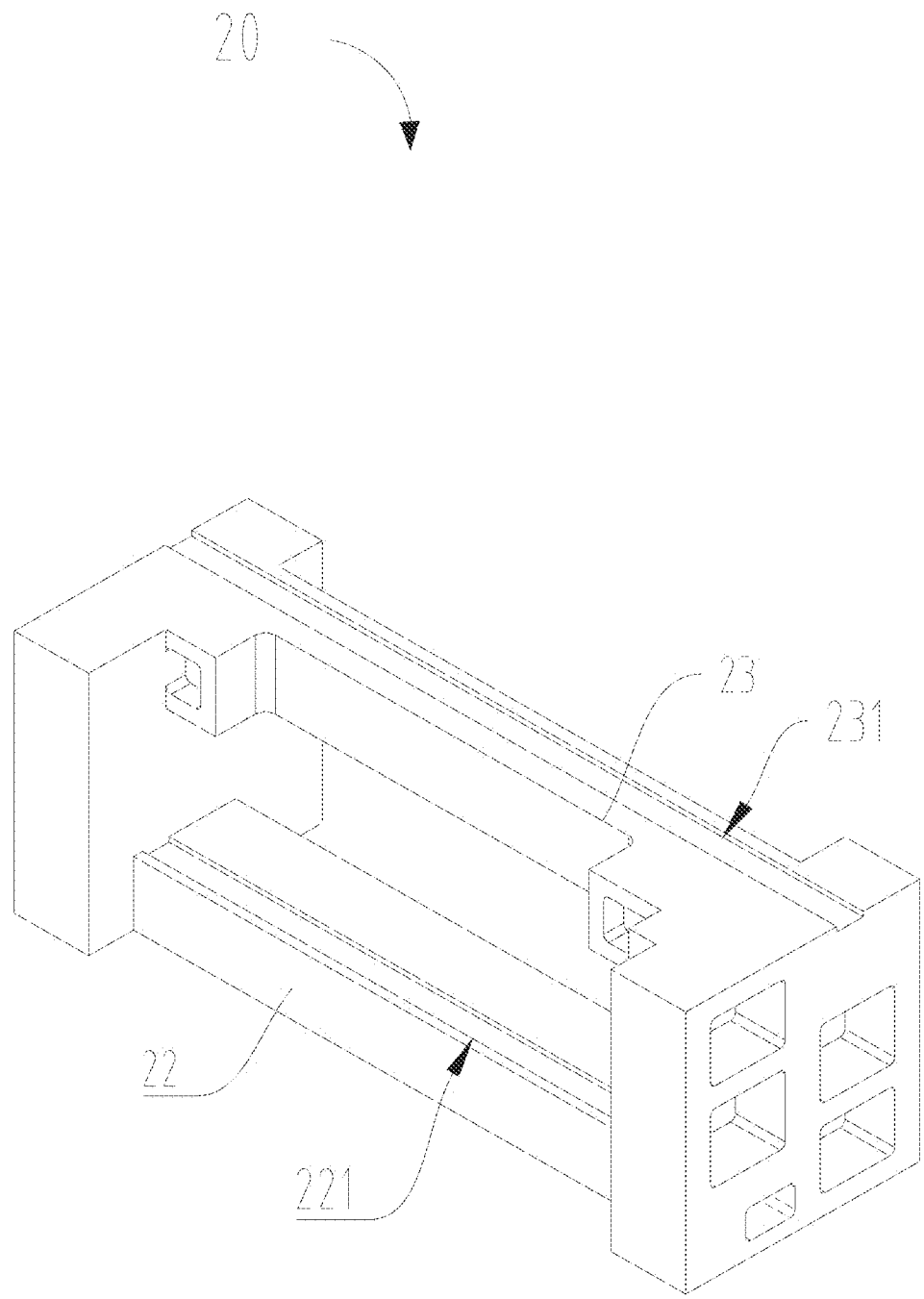
FIG. 13 is a perspective view of a beam of the machining center in the second embodiment of the present disclosure.
Figure 14:
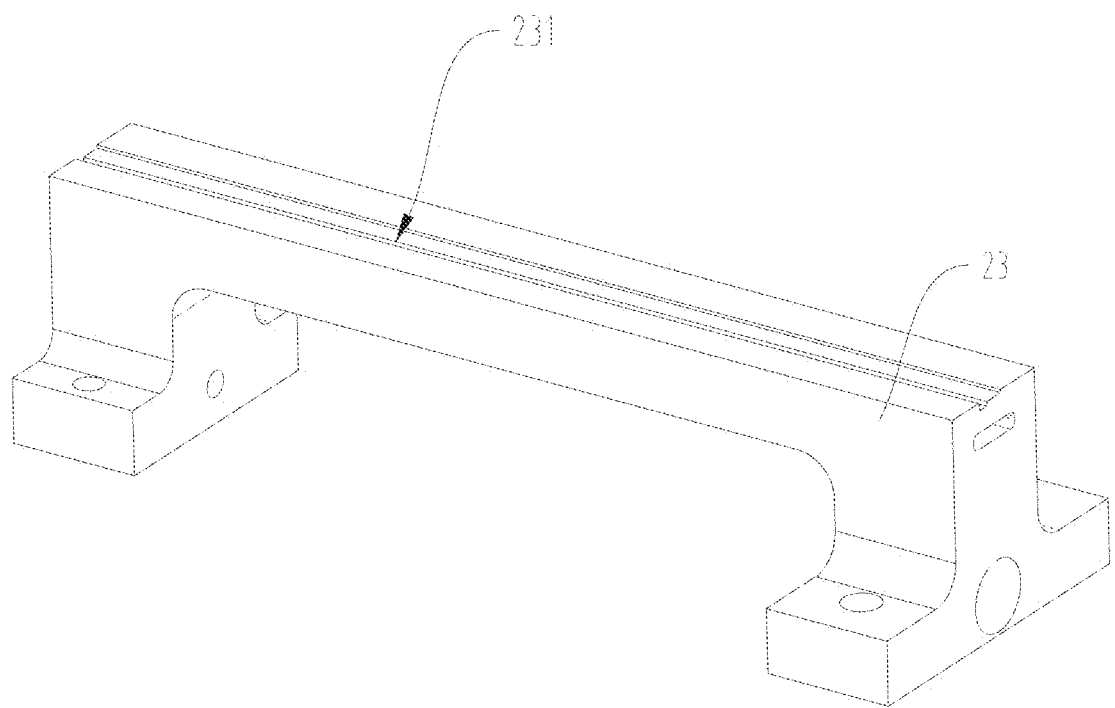
FIG. 14 is a perspective view of a first layer of the beam of the machining center in the second embodiment of the present disclosure.

The beam 20 can include a first layer 22 and a second layer 23 which are laminated. Referring to FIGS. 12 to 14, FIG. 12 shows the perspective view of the column 10 of the machining center 100a in the second embodiment of the present disclosure, FIG. 13 shows the perspective view of the beam 20 of the machining center 100a in the second embodiment of the present disclosure, and FIG. 14 shows the perspective view of the first layer 22 of the beam 20 of the machining center 100a in second embodiment of the present disclosure. The first layer 22 of the beam 20 can be integrally arranged with the two columns 10. The second layer 23 of the beam 20 can be detachably connected to a connection part of the first layer 22 and the column 10 of the beam 20. Such that the stability of the two columns 10 can be enhanced, and disassembly and assembly of the slider 30, the first main shaft 60 and the second main shaft 70 can be facilitated.

Two first sliding grooves 221 can be formed in the two sides of the first layer 22 of the beam 20 in the length direction of the beam 20. The two first sliding grooves 221 can be parallel and spaced with each other. A second sliding groove 231 can be formed in a central axis of the second layer 23 of the beam 20 along the length direction of the beam 20, such that the sliding of the slider 30 can be facilitated, and the sliding direction can be more accurate and the machining precision can be improved.

Figure 15:
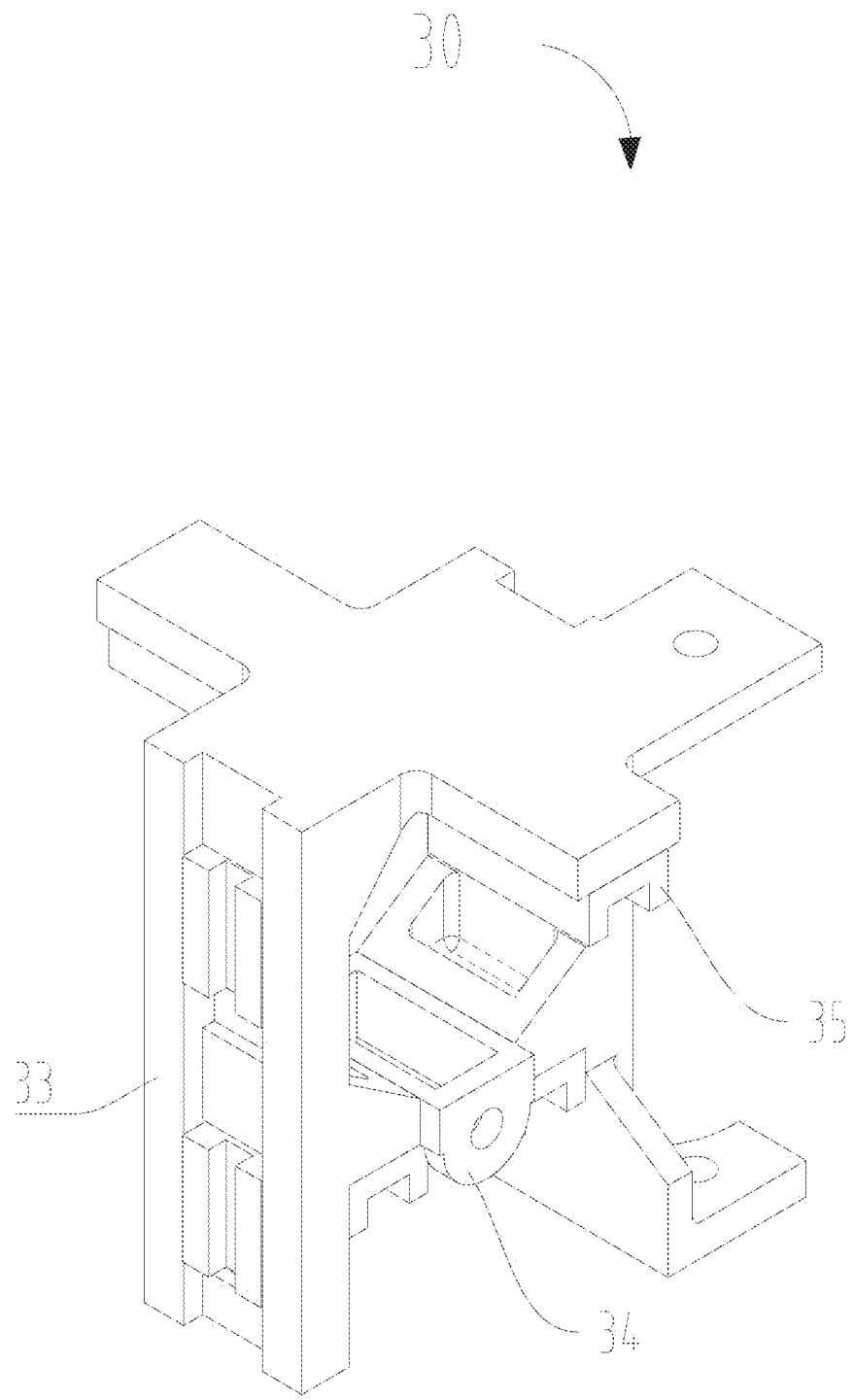
FIG. 15 is a perspective view of a slider of the machining center in the second embodiment of the present disclosure.
Figure 16:
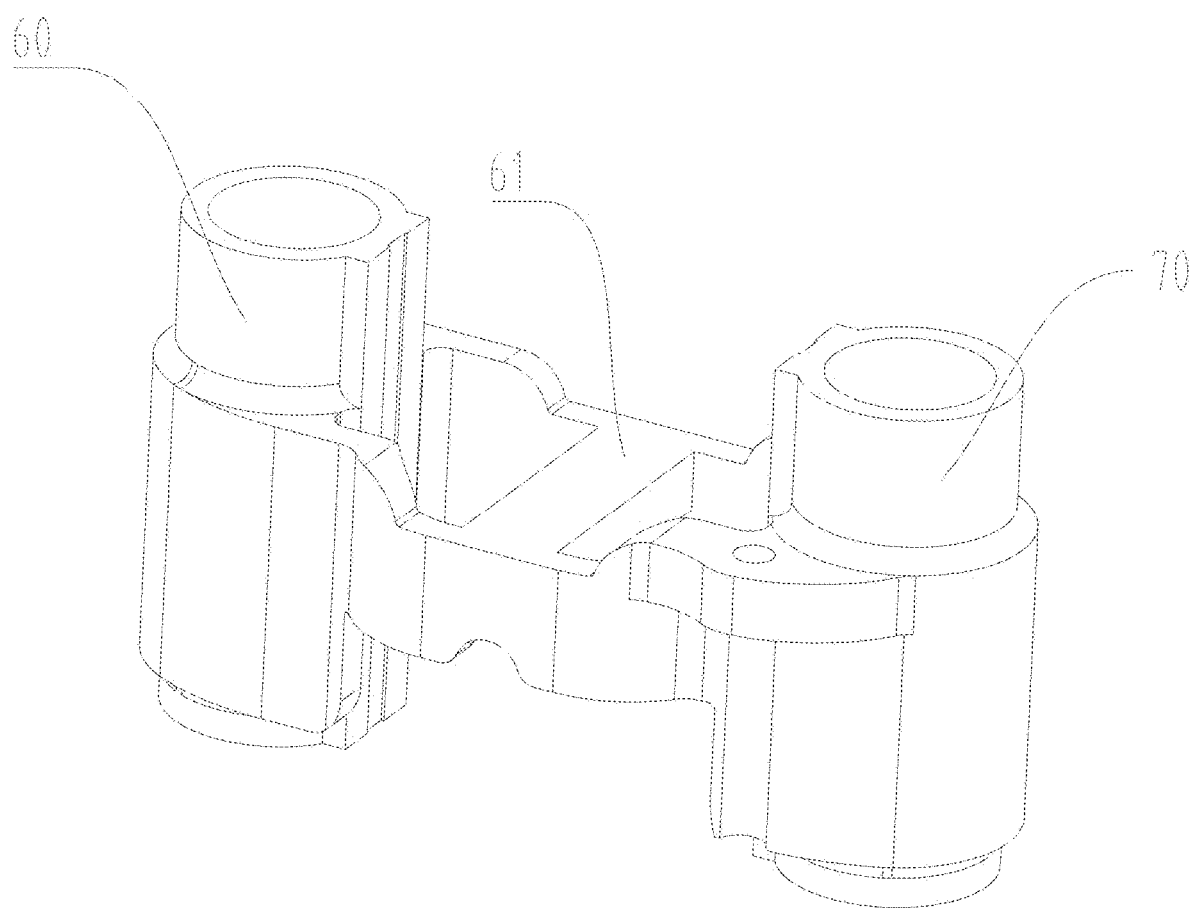
FIG. 16 is a perspective view of a first main shaft and a second main shaft of the machining center in the second embodiment of the present disclosure.

Referring to FIGS. 15 and 16, FIG. 15 shows the perspective view of the slider 30 of the machining center 100a in the second embodiment of the present disclosure, and FIG. 16 shows the perspective view of the first main shaft 60 and the second main shaft 70 of the machining center 100a in the second embodiment of the present disclosure. In the second embodiment, the number of the sliders 30 can be one, and the first main shaft 60 and the second main shaft 70 can be arranged on the slider 30 at the same time and symmetrically arranged relative to the slider 30. The slider 30 can be arranged between the first layer 22 and the second layer 23 of the beam 20 and perpendicular to the length direction of the beam 20. The two ends of the slider 30 can be respectively provided with two supports 33. The two supports 33 can extend out of the two sides of the beam 20. An upper portion of the slider 30 can cover the second layer 23 of the beam 20, and a lower portion of the slider 30 can cover the first layer 22 of the beam 20. Two spaced first sliding blocks 34 can be arranged at an end of the lower portion of the slider 30. The two first sliding blocks 34 can be respectively matched with the two first sliding grooves 221 of the beam 20. A second sliding block 35 can be arranged at an end of the upper portion of the slider 30. The second sliding block 35 can be matched with the second sliding groove 231 of the beam 20 to guarantee the movement accuracy of the slider 30.

The first driving member 40 can be arranged in a middle of the lower portion of the slider 30. The first main shaft 60 and the second main shaft 70 can synchronously move on the beam 20 under the fixed action of the two supports 33. Since the first main shaft 60 and the second main shaft 70 can move synchronously, vibration interference between the first main shaft 60 and the second main shaft 70 can be relatively low, such that the workpiece machined by the first main shaft 60 and the second main shaft 70 can have better machining precision.

In this embodiment, a connecting structure 61 can be further arranged between the first main shaft 60 and the second main shaft 70. The middle of the first main shaft 60 can be rigidly connected with the middle of the second main shaft 70 through the connecting structure 61, such that the synchronism of the movement of the first main shaft 60 and the second main shaft 70 can be guaranteed.

In this embodiment, the number of the second driving members 50 can be one. The first main shaft 60 and the second main shaft 70 can be connected to the second driving member 50. The second driving member 50 can be configured for driving the first main shaft 60 and the second main shaft 70 to move in the vertical direction. The movements of the first main shaft 60 and the second main shaft 70 can be completely synchronous.

The machining center of the present disclosure includes a single beam structure, so that the size and the weight can be reduced, a plurality of main shafts can be hung on the single beam, and the machining production capacity can be improved.

The technical personnel of the field can easily understand that the above optimization schemes can be freely combined and stacked on the premise without conflict.

It should be understood that the above-described embodiments are only exemplary and are not intended to be limiting. Without deviating from the underlying principles of the present disclosure, various obvious or equivalent modifications or replacements made by those skilled in the art according to the details can be within the scope of the claims of the present disclosure.

I claim:

1. A machining center configured for machining workpieces, the machining center comprising:
   at least one column,
   a beam,
   a slider,
   a first driving member,
   a second driving member,
   a first main shaft,
   a second main shaft, and
   a connecting structure,
   wherein the at least one column is configured for supporting the beam,
   wherein the slider is disposed on the beam and is slidable along a length direction of the beam,
   wherein both the first main shaft and the second main shaft are arranged on the slider and are each located on a respective one of two opposite lengthwise sides of the beam that are spaced from one another in a width direction of the beam that is transverse to the length direction of the beam,
   wherein the first driving member is configured for driving the slider and the connecting structure to slide relative to the beam,
   wherein the second driving member is configured for driving the first main shaft and the second main shaft to operate,
   wherein the connecting structure extends from the first main shaft to the second main shaft and extends through a through-hole that extends widthwise through the beam, and
   wherein the first main shaft and the second main shaft are configured for synchronously machining the workpieces.

2. The machining center of claim 1, wherein the first main shaft and the second main shaft are symmetrically arranged relative to the slider.

3. The machining center of claim 2, wherein the beam comprises a first layer and a second layer above and spaced with the first layer, a first sliding groove is formed in the first layer, a second sliding groove is formed in the second layer, and the slider is slidable along the length direction of the beam via the first sliding groove and the second sliding groove.

4. The machining center of claim 3, wherein the connecting structure is configured for being fixedly connected with the first main shaft and the second main shaft.

5. The machining center of claim 3, wherein there is an additional sliding groove formed in the first layer, which additional sliding groove is has a longitudinal direction that is parallel to the longitudinal direction of the first sliding groove.

6. The machining center of claim 5, wherein the second sliding groove is formed at a central axis of the second layer of the beam.

7. The machining center of claim 1, wherein one end of the at least one column is connected with the beam, and wherein a width dimension, extending in the width direction of the beam, of the one end of the at least one column close to the beam is smaller than that of an opposite end of the at least one column away from the beam.

8. The machining center of claim 7, wherein the at least one column comprises two columns, wherein each of the two columns is arranged at a respective one of two opposite ends of the beam and is configured for supporting the beam.

9. The machining center of claim 8, wherein the two columns each comprise a respective hollow structure.

10. The machining center of claim 1, wherein the machining center further comprises a base connected with the at least one column.

11. The machining center of claim 10, wherein the machining center further comprises at least one supporting board configured for bearing the workpieces, and wherein a sliding rail is disposed on the base so that the at least one supporting board is slidable relative to the base along the sliding rail.

12. The machining center of claim 11, wherein the machining center further comprises at least one third driving member, wherein a nut and screw rod mechanism is disposed between the at least one third driving member and the at least one supporting board, and wherein the at least one third driving member drives the at least one supporting board to slide along the sliding rail via the nut and screw rod mechanism.

13. The machining center of claim 12, wherein the at least one supporting board comprises one supporting board and wherein the at least one third driving member comprises one third driving member.

14. The machining center as claimed in claim 12, wherein the at least one supporting board is arranged below the beam.

15. The machining center of claim 1, wherein the at least one column comprises a plurality of corners that are arc-shaped.

* * * * *